Dec. 15, 1936.     D. SLOTSKY     2,064,228
LENS
Filed Dec. 6, 1934

INVENTOR.
David Slotsky.
BY
George V. Hoodling
ATTORNEY.

Patented Dec. 15, 1936

2,064,228

UNITED STATES PATENT OFFICE 2,064,228

LENS

David Slotsky, Cleveland, Ohio

Application December 6, 1934, Serial No. 756,299

14 Claims. (Cl. 88—54)

My invention relates in general to lenses and more particularly to lenses constructed of dissimilar pieces of glass having different indexes of refraction.

It is an object of my invention to provide a bi-focal lens with a zonal insert having a curved top which curvature corresponds substantially with the curvature of the lower eye lid of a person.

It is a further object of my invention to provide a bi-focal lens with a zonal insert having a curved bottom which curvature corresponds substantially with the curvature of the upper eye lid of a person.

Another object of my invention is the provision of a lens having a distant vision portion of a certain index of refraction and a near vision portion of a different index of refraction from that of the distant vision portion.

Another object of my invention is the provision of a lens having an upper distant vision portion of a certain index of refraction, an intermediate vision portion of a higher index of refraction, and a lower reading, or near vision portion, of a still higher index of refraction, so that the user may obtain clear vision to accommodate the various conditions under which the visual object is seen.

Another object of my invention is to provide for so fusing the zonal insert or button in a countersink lens that the disagreeable reflection from the edges of the juncture of the insert is reduced to a minimum.

Another object of my invention is the provision of a unfused assembled button which may be fused with the countersink lens in one fusing or heating operation.

A further object of my invention is to provide for making a lens having one or more zonal inserts in one fusing process, thereby avoiding the double heating or fusing process normally employed in making lenses having zonal inserts.

A still further object of my invention is the provision of an unfused assembled button or insert comprising a stepped piece of glass having a certain index of refraction and a segmental piece of glass having a lower index of refraction adapted to fit into the stepped piece of glass.

A still further object of my invention is to provide for reducing the time normally required to fuse lenses having zonal inserts by utilizing an unfused assembled button, in which the major part of the unfused button is constructed of flint glass having a relatively low fusing point and in which the minor part of the unfused assembled button is constructed of crown glass having a higher fusing point, whereby the resultant time normally required to fuse the button is materially reduced.

A still further object of my invention is to provide for using fine particles of glass between the adjoining edges of the dissimilar piece of glass of the unfused button, so that, when the unfused button is fused with the countersink lens, there is provided a gray edge along the juncture of the zonal insert which minimizes the disagreeable reflection as the line of vision passes from the distant vision portion to the zonal or near vision portion, or vice versa.

Another object of my invention is to provide for minimizing the discoloring normally caused by the double fusing operation in constructing lenses having zonal inserts by fusing an unfused button with a countersink lens in one fusing or heating operation.

Other objects and a fuller understanding of my invention may be had by referring to the following description and claims, taken in conjunction with the accompanying drawing in which:

Figure 14:
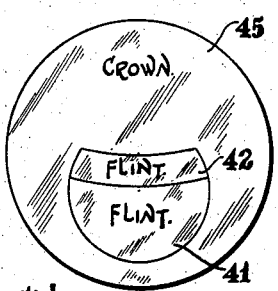
Figure 13:
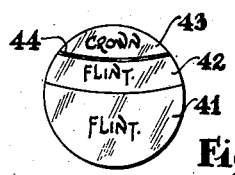

Figure 13 is a further modified form of my unfused button, in which the major flint portion having a relatively high index of refraction is provided with an enlarged stepped portion, adapted to receive a segmental piece of flint glass of a lower index of refraction, and a piece of crown glass having a still lower index of refraction; and Figure 14 is a plan view of a lens having zonal inserts constructed in accordance with the button, as shown in Figure 13.

With reference to the drawing, the reference character 20 represents a blank of crown glass having a countersink 21 which may be ground or otherwise provided therein, either on the outside or the inside in accordance with the usual construction of making countersinks. In the construction of lenses having zonal inserts, a button is placed over the countersink and fused therewith, after which the entire lens is reshaped or ground to meet the accommodation of the particular user.

In the construction of a lens having a zonal insert, in accordance with the provision of my invention, I utilize an unfused button which comprises a stepped piece of flint glass 22 having a segmental stepped portion 23, and a segmental piece of crown glass 24 adapted to fit into the stepped portion 23. As illustrated, the stepped piece of flint glass 22 which may be of any color comprises the major portion of the button. In the manufacture of the stepped piece of flint glass 22, it may be either molded in its desired form or made by taking a blank of flint glass and grinding, or otherwise removing, the stepped portion 23. In a similar manner, the segmental piece 24 may be molded or made by taking a blank piece of crown glass and grinding or otherwise shaping it in its desired form.

Figure 1:
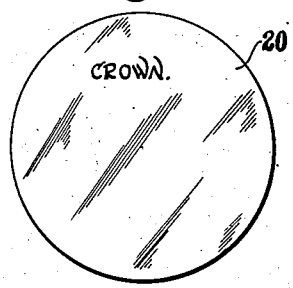
Figure 1 represents a plan view of a blank of crown glass.
Figure 2:
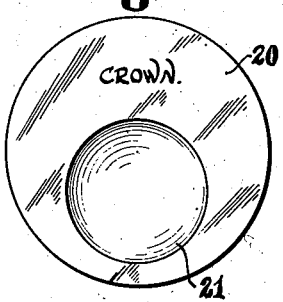
Figure 2 represents a plan view of a blank of a crown glass having a countersink.
Figure 3:
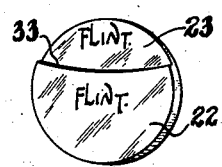
Figure 3 represents a perspective view of a stepped piece of flint glass, and comprises the major portion of the unfused button or insert.
Figure 4:
Figure 4 is a perspective view of a segmental piece of crown glass adapted to fit into the stepped piece of flint glass, shown in Figure 3.
Figures 5, 6:
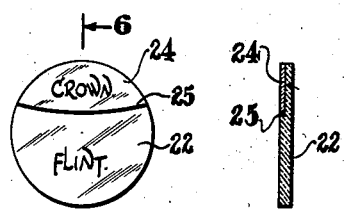
Figure 5 is a plan view of the assembled unfused button or insert, showing the segmental piece of crown glass inserted in the stepped piece of flint glass.
Figure 6 is a cross sectional view of the assembled unfused button or insert, taken along the line 6—6 of Figure 5.

The upper surface of the stepped portion 23, when finished, is smooth and even, and the lower complementary surface of the segmental crown piece 24, when finished, is likewise smooth and even, so that when the segmental crown piece 24 is inserted in the stepped portion 23, there is a good mating of the adjoining surfaces. The piece of crown glass 24 and the piece of flint glass 22 are finished, so that their outside surfaces lie substantially in the same plane such as that shown in Figures 6 and 7. The curved stepped edge 33 of the stepped flint portion 22, is polished to give a good smooth surface. Similarly the lower and corresponding curved edge 34 of the segmental crown piece 24 is polished to give a smooth surface. When placing the segmental crown piece 24 in the stepped portion 23, there is provided between their adjoining edges 33 and 34, a thin layer of fine particles of ground glass. This is designated by the reference character 25, see Figures 5 and 6. To facilitate the assembling of the fine particles of ground glass, a mixture with water is made to give a semi-liquid paste which may be spread along the edges 33 and 34, so that when the segmental crown piece 24 is inserted in the stepped portion 23, there is provided a layer of fine particles of ground glass. After the unfused button 24 is assembled, as shown in Figures 5 and 6 it is placed over the countersink 21 and secured thereto by a spring clip 28, preparatory to the fusing operation, see Figure 7.

Figure 7:
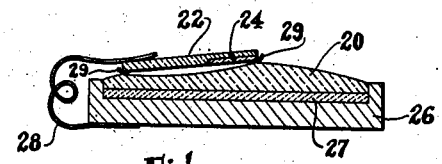
Figure 7 is a cross sectional view of the unfused button, being placed over the countersink, preparatory to the fusing or heating process.

When fusing the assembled button into the countersink, the blank of crown glass 20 is placed in a tray 26 having a layer of carborundum 27, or other suitable material, upon which the blank 20 firmly and evenly rests to avoid any distortion of the blank 20 during the fusing operation. As illustrated in Figure 7, the unfused button rests upon metal inserts 29, which may be arranged at various points around the countersink. These metal inserts 29 are employed so that during the fusing of the button, the air, which may be normally trapped therein, may escape as the button fuses and drops down into the countersink. The metal inserts 29 are ground away during the refinishing or regrinding of the lens into their final shape.

Figure 8:
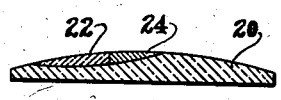
Figure 8 is a cross sectional view of the finished lens after the unfused button has been fused into the countersink blank.

With my invention, the time required to fuse the button into the countersink is relatively short, for the reason that the major portion of the button is made of flint glass which has a relatively low fusing point as compared to crown glass which constitutes only a minor thin portion of the button. The minimizing of the time required to fuse the button into the countersink, is a very important provision, not only from the standpoint of saving time, but also from the standpoint of minimizing the discoloring in the zonal insert caused by a prolonged fusing operation. Also, the discoloring in the zonal insert is materially minimized by reason of the fact that I utilize an assembled unfused button which is fused into a countersink in one heating operation, thereby avoiding the double heating operation normally employed in constructing lens having zonal inserts. After the fusing operation is completed, the compound lens is ground to the desired shape for the particular user, at the same time removing the metal inserts 29. The finished shapes may be similar to that shown in Figure 8, wherein the reference character 22 designates the flint zonal glass insert, and the reference character 24 the crown glass which becomes an integral part of the blank 20 and thus becomes disappearing.

The purpose of the thin layer of fine particles of ground glass 25 is to make the juncture between the flint glass 22 and the crown glass 24 to have a gray finish to avoid the disagreeable reflection, as would otherwise be produced if the juncture had a bright finish. The fine particles of crown glass may be made with crown glass, or of flint glass, or of both.

Figure 9:
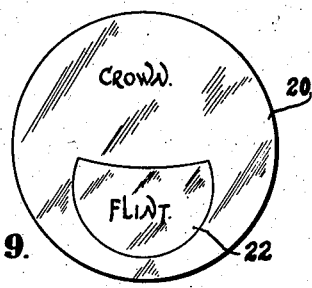
Figure 9 is a plan view of a lens having a zonal insert, constructed in accordance with the provision of my invention.

The finished lens is shown in Figure 9 and the flint portion 22 constitutes the zonal insert and has a shape that corresponds to the upper surface of the flint piece of glass 22. The upper edge of the zonal flint insert 22 is curved negatively downwardly, which curvature substantially corresponds to the curvature of the lower eye lid of a person. By making the upper edge of the zonal flint insert 22 curved, the user may have, while walking, for instance, a clear vision relatively close to himself without bending his head down, as would normally be the case if the top edge of the zonal flint insert 22 were flat. In accordance with the usual practice of making zonal inserts, the flint zonal insert 22 has a higher index of refraction than the crown glass 20. To give good accommodation to the user, the place of the maximum power, that is the place where the user naturally looks through, being the optical center of the zonal flint insert 22, is somewhat below the curved upper edge, and the place of the maximum power, that is the optical center of the crown glass 20, is somewhat above the curved edge. Therefore, the eye needs to move only a short distance, as the line of vision passes from one optical center to the other, thus avoiding the customary inability to accommodate one's self to the use of a bi-focal lens. When a stepped piece of colored flint glass 22, and when a segmental piece of plain crown glass 24 are fused to a plain blank 20, there is produced, after grinding, a colored zonal insert for reading and a plain crown glass for distance.

Figure 10:
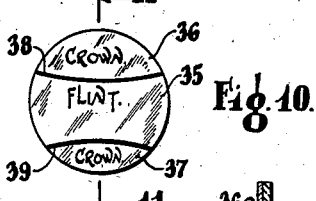
Figure 10 is a modified form of an assembled unfused button or insert, in which the flint piece of glass is provided with two stepped portions having, respectively an upper and a lower segmental piece of crown glass, adapted to fit in the stepped portion.
Figure 11:
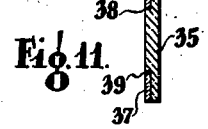
Figure 11 is a cross sectional view of the modified form of my unfused button, taken along the line 11—11 of Figure 10.
Figure 12:
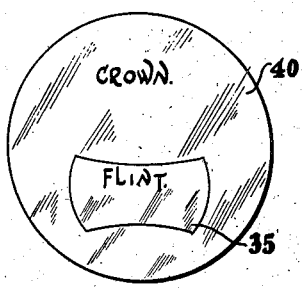
Figure 12 is a plan view of a lens having a zonal insert constructed in accordance with the modified form of my invention.

In Figures 10, 11 and 12, I show a modified form of a zonal insert in which the lower portion of the zonal flint insert 35 is removed to provide a clear, distant vision below the zonal insert. In this modified form, the stepped piece of flint glass 35 is provided with an upper and a lower stepped portion, having, respectively, mounted therein an upper segmental crown piece 36 and a lower segmental crown piece 37. The method of constructing and assembling this modified form of button is the same as that previously described with reference to the preferred form of my invention. In Figures 10 and 11, the reference characters 38 and 39 represent, respectively, the layer of fine particles of ground glass, provided between the juncture of the stepped piece of flint glass 35 and the segmental pieces of crown glass 36 and 37 respectively. The method of fusing the modified button, as shown in Figures 10 and 11, into the crown blank 40, is the same as that previously described, and the lens when completed has a zonal insert taking a shape as that designated by the reference character 35 in Figure 12. The curvature of the lower edge of the zonal insert 35 corresponds substantially with the curvature of the upper eye lid of a person. In this manner, the user is able to have clear distant vision below the zonal insert 35, without tilting his head backwards, so that the line of vision misses the lower portion of the zonal insert as would be the case as that shown in Figure 9.

In Figures 13 and 14, I show another modified form of my invention, in that the major piece of flint glass 41 is provided with an enlarged stepped portion sufficient to receive a segmental piece of crown glass 43 and an intermediate piece of flint glass 42. The reference character 44 designates the thin layer of fine particles of glass provided between the crown piece of glass 43 and the intermediate flint piece of glass 42. In this form of my invention, the flint piece 41 has a high index of refraction for near vision or close reading, the intermediate piece of flint glass 42 has a lower index of refraction for intermediate vision, and the crown piece 43 has a lower index of refraction, being the same as that of the crown blank 45. The method of making this modified unfused button, and fusing the same to the crown blank 45 is the same as that previously described in connection with the other forms of my invention. The finished lens made in accordance with the latter form of my invention, is shown in Figure 14. In the trifocal lens, in Figures 13 and 14, the flint 41 and 42 may be colored, or the flint 41 may be colored and the flint 42 may be plain.

It is to be noted that there is common to all forms of my invention, the principle of employing an assembled unfused button which may be fused into the countersink in one fusing operation, thus avoiding the double fusing process normally employed in making lenses having zonal inserts.

Although I have described my invention with a certain degree of particularity, it is understood that the present disclosure has been made only by way of example and that numerous changes in the details of construction and the combination and arrangement of parts may be resorted to without departing from the spirit and scope of the invention as hereinafter claimed.

I claim as my invention:

1. In a method of constructing a button for insertion in a countersink of a major lens by joining dissimilar pieces of glass so that the reflection from the edges of the juncture is minimized comprising providing dissimilar pieces of glass having their joining edges substantially aligned with each other, polishing the joined edges of the dissimilar pieces of glass, providing fine particles of glass between the joining edges of the dissimilar pieces of glass, and fusing the fine particles of glass and the dissimilar pieces of glass in the countersink of the major lens, thus producing a juncture in which the reflection from the joined edges is minimized by the fusion of the fine particles of glass.

2. The method of forming a lens of a plurality of dissimilar pieces of glass fused together in one heating comprising, providing a major piece of crown glass with a countersink, forming an integral piece of flint glass to fit the countersink, grinding a stepped portion in one side of the integral piece of flint glass, providing a segmental piece of crown glass to fit into the stepped piece of flint glass, assembling the stepped piece of flint glass and the segmental piece of crown glass over the countersink in such position that the segmental piece of crown glass and the stepped side of the flint glass are on the underneath side of the assembled unfused button next to the countersink, thereby making the stepped portion of the flint glass overlap and extend above the segmental piece of crown glass, and fusing the assembled button in the countersink of the major piece of crown glass in one heating.

3. The method of forming a lens of a plurality of dissimilar pieces of glass fused together in one heating comprising, providing a major piece of crown glass with a countersink, forming an integral body piece of flint glass to fit the countersink, grinding a stepped portion in one side of the integral piece of flint glass, providing a curved stepped edge between the body portion and the stepped portion, providing a segmental piece of crown glass having a complementary curved edge arranged to match the said stepped curved edge and adapted to fit into the stepped piece of flint glass, assembling the stepped piece of flint glass and the segmental piece of crown glass over the countersink in such position that the segmental piece of crown glass and the stepped side of the flint glass are on the underneath side of the assembled unfused button next to the countersink, thereby making the stepped portion of the flint glass overlap and extend above the segmental piece of crown glass, fusing the assembled button in the countersink of the major piece of crown glass in one heating, and grinding the lens until the overlapped stepped portion of the flint glass is ground away, thereby exposing the body portion of the flint glass with said curved edge between the said body portion and the segmental piece of crown glass.

4. The method of forming a lens of a plurality of dissimilar pieces of glass fused together in one heating comprising, providing a major piece of crown glass with a countersink, providing an integral body piece of flint glass to fit the countersink, grinding a stepped portion in one side of the integral piece of flint glass, providing a segmental piece of crown glass to fit into the stepped piece of flint glass, assembling the stepped piece of flint glass and the segmental piece of crown glass over the countersink in such position that the segmental piece of crown glass and the stepped side of the flint glass are on the underneath side of the assembled unfused button next to the countersink, thereby making the stepped portion of the flint glass overlap and extend above the segmental piece of crown glass, fusing the assembled button in the countersink of the major piece of crown glass in one heating, and grinding the lens until the overlapped stepped portion of the flint glass is ground away, thereby exposing the body portion of the flint glass and the segmental piece of crown glass.

5. In a method of constructing an insert button for insertion in a countersink of a major lens which comprises forming a piece of glass of one integral piece to fit the countersink and shaping a stepped portion in one of the sides of the integral piece of glass, forming a second integral piece of dissimilar glass to fit into the stepped portion of the first mentioned integral piece of glass, assembling the said pieces of glass into a button, placing the button over the countersink with the second integral piece of dissimilar glass adjacent the countersink of the major lens, fusing the button to the major piece of crown glass, and grinding the major piece of crown glass and the button.

6. In a method of constructing an insert button for insertion in a countersink of a major lens which comprises forming an integral piece of glass of a certain refractive index to fit the countersink, grinding a stepped portion in one of the sides of the integral piece of glass, forming a second integral piece of glass of a different refractive index to fit into the stepped portion of the first mentioned integral piece of glass, assembling the said pieces of glass into a button, placing the button over the countersink with the second integral piece of glass adjacent the countersink of the major lens, fusing said pieces of glass in the countersink of the major lens, and grinding the major lens and the said pieces of glass.

7. The method of forming a lens of a plurality of dissimilar pieces of glass fused together which comprises, providing a major piece of crown glass with a countersink, forming an integral piece of flint glass to fit the countersink, grinding a stepped portion in one of the sides of the integral piece of flint glass, forming a segmental piece of crown glass to fit into the stepped portion of the flint glass, assembling the flint glass and the segmental piece of crown glass into an unfused button, placing the unfused button over the countersink with the piece of crown glass adjacent the countersink of the major lens, fusing the button to the major piece of crown glass, and grinding the major piece of crown glass and the button.

8. The method of forming a lens of a plurality of dissimilar pieces of glass fused together which comprises, providing a major piece of crown glass with a countersink, forming an integral piece of flint glass to fit the countersink, grinding a stepped portion in one of the sides of the integral piece of flint glass, forming a segmental piece of crown glass to fit into the stepped portion of the flint glass, assembling the flint glass and the segmental piece of crown glass into an unfused button and providing fine particles of glass between the joining edges of the said pieces, placing the unfused button over the countersink with the piece of crown glass adjacent the countersink of the major lens, fusing the button to the major piece of crown glass, and grinding the major piece of crown glass and the button.

9. A button for insertion in a countersink of a major lens comprising, in combination, a stepped piece of flint glass having its stepped side adapted to fit the countersink, said stepped piece of glass being formed of one integral piece and having a thick portion and a thin portion with a stepped edge between said portions, a segmental piece of crown glass arranged adjacent the countersink of the major lens and having a complementary edge arranged to match the said stepped edge and adapted to fit into the stepped piece of flint glass, the arrangement of the button being such that the stepped piece of flint glass is larger than the segmental piece of crown glass and such that the stepped piece of flint glass holds the segmental piece of glass against the countersink of the major lens.

10. A button for insertion in a countersink of a major lens comprising, in combination, a stepped piece of colored flint glass having its stepped side adapted to fit the countersink, said stepped piece of glass being formed of one integral piece and having a thick portion and a thin portion with a stepped edge between said portions, a segmental piece of plain crown glass arranged adjacent the countersink of the major lens and having a complementary edge arranged to match the said stepped edge and adapted to fit into the stepped piece of flint glass, the arrangement of the button being such that the stepped piece of flint glass is larger than the segmental piece of crown glass and such that the stepped piece of flint glass holds the segmental piece of glass adjacent the countersink of the major lens.

11. A button for insertion in the countersink of a major lens comprising, in combination, a stepped piece of glass of a certain refractive index having its stepped side adapted to fit the countersink of the major lens, said piece of glass being formed of one integral piece and having a thick portion and a thin portion with a stepped edge between said portions, a segmental piece of glass arranged adjacent the countersink of the major lens and having a lower index of refraction adapted to fit into the stepped piece of glass, said segmental piece of glass having a complementary edge arranged to match the said stepped edge, the arrangement of the button being such that the stepped piece of glass holds the segmental piece of glass against the countersink of the major lens.

12. A button for insertion in the countersink of a major lens comprising, in combination, a stepped piece of glass of a certain refractive index having its stepped side adapted to fit the countersink, said stepped piece of glass being formed of one integral piece and having a thick portion and a thin portion with a stepped edge between said portions, a plurality of segmental pieces of glass, each having a different refractive index from each other and from that of the stepped piece of glass arranged adjacent the countersink of the major lens, the said segmental pieces having complementary edges arranged to match each other and arranged to match the said stepped edge and adapted to fit into the stepped piece of glass, the arrangement of the button being such that the stepped piece of glass holds the plurality of segmental pieces of glass against the countersink of the major lens.

13. In a method of joining the edge of two adjacent pieces of glass so that the reflection upon the edges of the juncture is minimized comprising, providing two pieces of glass having their joining edges substantially aligned with each other, polishing the joined edges of the two pieces of glass, providing fine particles of glass between the joining edges of the two pieces of glass, and fusing the two pieces of glass together with the fine particles of glass therebetween, thus producing a juncture in which the reflection upon the joined edges is minimized by the fusion of the fine particles of glass.

14. In a method of constructing an insert button for insertion in a countersink of a major lens, which comprises forming an integral piece of flint glass and a segmental piece of crown glass to fit the countersink, shaping a stepped portion in the flint glass to match the segmental piece of crown glass, assembling the flint glass and the segmental piece of crown glass into a button and placing the button over the countersink of the major lens with the piece of crown glass adjacent to the countersink of the major lens, fusing the button to the major piece of crown glass, and grinding the major piece of crown glass and the button.

DAVID SLOTSKY.